(12) United States Patent
Oishi et al.

(10) Patent No.: US 8,911,825 B2
(45) Date of Patent: Dec. 16, 2014

(54) FIBER-REINFORCED HEAT-RESISTANT SOUND-ABSORBING MATERIAL AND PROCESS FOR PRODUCING THE SAME

(75) Inventors: Tsutomu Oishi, Tokyo (JP); Yoshizumi Tanaka, Yamaguchi (JP); Norifumi Miyamoto, Yamaguchi (JP); Michiyuki Suzuki, Yamaguchi (JP); Mitsuhiko Sato, Yamaguchi (JP)

(73) Assignees: IHI Corporation, Tokyo (JP); Ube Industries, Ltd., Yamaguchi (JP)

( * ) Notice: Subject to any disclaimer, the term of this patent is extended or adjusted under 35 U.S.C. 154(b) by 1114 days.

(21) Appl. No.: 12/893,942

(22) Filed: Sep. 29, 2010

(65) Prior Publication Data
US 2011/0012047 A1    Jan. 20, 2011

Related U.S. Application Data

(62) Division of application No. 10/599,281, filed as application No. PCT/JP2005/002437 on Feb. 17, 2005, now Pat. No. 7,829,479.

(30) Foreign Application Priority Data

Apr. 13, 2004 (JP) ................................ 2004-118077

(51) Int. Cl.
*B05D 3/02* (2006.01)
*C04B 35/195* (2006.01)
(Continued)

(52) U.S. Cl.
CPC ........ *C04B 35/624* (2013.01); *C04B 2235/3206* (2013.01); *C04B 35/195* (2013.01); *C04B*
(Continued)

(58) Field of Classification Search
USPC ......................................................... 427/226
See application file for complete search history.

(56) References Cited

U.S. PATENT DOCUMENTS

| | | |
|---|---|---|
| 4,464,475 A | 8/1984 | Beall et al. |
| 5,126,087 A | 6/1992 | Lespade et al. |
| 5,895,897 A | 4/1999 | Sasaki |

FOREIGN PATENT DOCUMENTS

| | | |
|---|---|---|
| JP | 10-187163 | 7/1998 |
| JP | 10-194864 | 7/1998 |

(Continued)

OTHER PUBLICATIONS

Hu Ching et al., "Investigation of Sol-Gel Processing of Ceramic Matrix Composites," AMD-vol. 194, Mechanics in Materials Processing and Manufacturing, ASME 1994, pp. 353-360. XP009131046.

(Continued)

*Primary Examiner* — Nathan Empie
(74) *Attorney, Agent, or Firm* — Griffin & Szipl, P.C.

(57) ABSTRACT

A production process which comprises a preform formation step of forming a fiber preform made of silicon carbide short fibers having heat resistance of 1000° C. or greater; a sol-gel preparation step of preparing a sol-gel solution containing a heat resistant compound having heat resistance of 1000° C. or greater; an impregnation-drying-calcination step of impregnating the fiber preform with the sol-gel solution, followed by drying and calcining; and a crystallization step of crystallizing the fiber preform after impregnation, drying and calcination.

3 Claims, 5 Drawing Sheets

(51) Int. Cl.
- *C04B 35/19* (2006.01)
- *C04B 35/626* (2006.01)
- *C04B 38/00* (2006.01)
- *C04B 35/80* (2006.01)
- *C04B 35/624* (2006.01)
- *C04B 30/02* (2006.01)

(52) U.S. Cl.
CPC ............... 2235/80 (2013.01); *C04B 2235/3251* (2013.01); *C04B 2235/524* (2013.01); C04B 35/19 (2013.01); *C04B 2235/3205* (2013.01); C04B 35/6264 (2013.01); *C04B 2235/401* (2013.01); *C04B 2235/441* (2013.01); *C04B 2235/77* (2013.01); C04B 38/0022 (2013.01); *C04B 2235/3418* (2013.01); *C04B 2235/9607* (2013.01); C04B 35/803 (2013.01); *C04B 2235/5244* (2013.01); *C04B 2235/421* (2013.01); *C04B 2235/608* (2013.01); C04B 30/02 (2013.01); *C04B 2235/3215* (2013.01); *C04B 2235/3203* (2013.01); *C04B 2235/5264* (2013.01); *C04B 2235/3208* (2013.01); *C04B 2235/526* (2013.01)

USPC ........................................................ 427/226

(56) References Cited

FOREIGN PATENT DOCUMENTS

| | | |
|---|---|---|
| JP | 2000-154066 | 6/2000 |
| JP | 2001-010871 | 1/2001 |
| JP | 2002-167290 | 6/2001 |

OTHER PUBLICATIONS

International Search Report corresponding to European Application No. EP 05719239.5, completed Mar. 18, 2010.

Search Report issued in corresponding International Application No. PCT/JP2005/002437, completed May 19, 2005 and mailed Jun. 7, 2005.

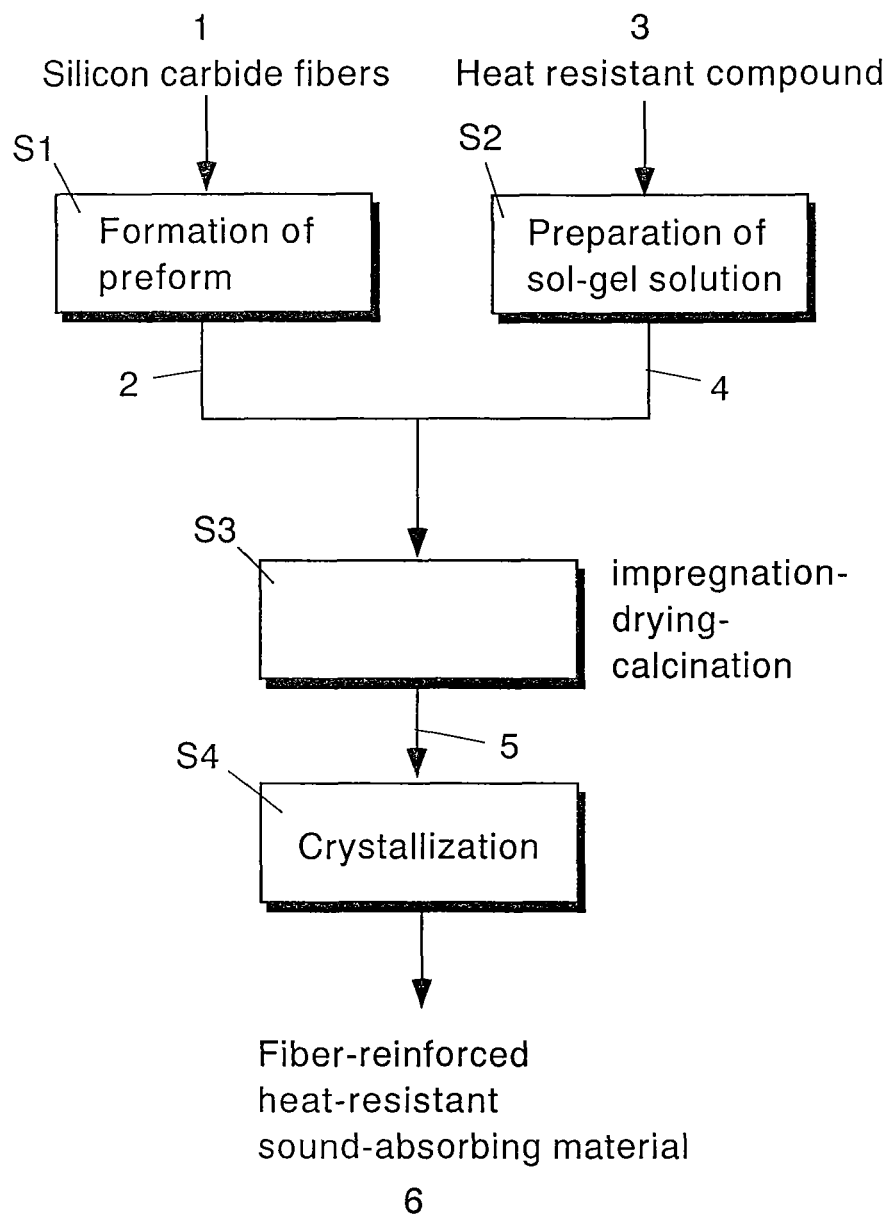

FIBER-REINFORCED HEAT-RESISTANT SOUND-ABSORBING MATERIAL AND PROCESS FOR PRODUCING THE SAME

This is a divisional application of U.S. patent application Ser. No. 10/599,281, which was filed on Sep. 25, 2006 as the National Phase Application in the United States of International Patent Application No. PCT/JP2005/002437 filed Feb. 17, 2005, which claims priority on Japanese Patent Application No. 118077/2004, filed Apr. 13, 2004. The entire disclosures of the above patent applications are hereby incorporated by reference.

BACKGROUND OF THE INVENTION

1. Technical Field of the Invention

The present invention relates to a fiber-reinforced heat-resistant sound-absorbing material used for the exhaust nozzle and the like of a jet engine and a process for producing the material.

2. Description of the Related Art

Conventional sound-absorbing materials used for the exhaust nozzle and the like of a jet engine have a honeycomb structure. The sound-absorbing material having a honeycomb structure is comprised of a honeycomb made of a heat resistant alloy, a perforated plate, and a rear plate and it has a reactive structure like a Helmholtz resonator, and sound is diminished by the counteractive offset by the reflection, on the rear plate, of sound waves incident from the perforated plate.

In such a sound-absorbing material having a honeycomb structure, the perforated plate, inner honeycomb and rear plate of the material are overheated by a high temperature exhaust gas (for example, from 700 to 800 K or greater) and sometimes change their shape greatly. For example, since the perforated plate is made of a stainless or aluminum panel, the plate may be damaged or deformed by heat, and the brazed portion between the plate and honeycomb may peel.

Furthermore, a sound-absorbing material having the above-described structure can absorb only sound in a narrow frequency band so that noise in a wide frequency band (for example, from 1000 to 4000 Hz) produced by a jet engine cannot be absorbed satisfactorily.

A variety of sound-absorbing materials equipped with both heat resistance and capacity of absorbing sound in a wide frequency band have been proposed (for example, refer to Patent Documents 1 to 3).

According to "a lightweight ceramic sound-absorbing material and a process for producing the same" of Patent Document 1, a sound-absorbing material having both thermal shock resistance and sound-absorbing performance heightened by stacking a dense layer containing ceramic fibers over the surface of a porous foamed ceramic is disclosed.

According to "a lightweight CMC sound-absorbing material and a process for producing the same" of Patent Document 2, the absorbing material is a porous material made of an alumina-based ceramic containing SiC whiskers and having a porosity of from 80 to 92%. It has an improved sound absorption coefficient by controlling its flow resistance by adding silicon carbide fibers without changing the bulk density.

"A porous sound-absorbing material and a process for producing the same" of Patent Document 3 is characterized in that it has a skeleton made of an aggregate having pores and the porous sound-absorbing material has a porosity of from 75% to 85%.

[Patent Document 1] Japanese Patent Laid-Open No. Hei 10-187163

[Patent Document 2] Japanese Patent Laid-Open No. Hei 10-194864

[Patent Document 3] Japanese Patent Laid-Open No. 2002-167290

The lightweight ceramic sound-absorbing material according to Patent Document 1 has many layers of several sound-absorbing materials stacked one after another so that its production cost is high. Moreover, since the sound-absorbing material is manufactured by foaming ceramics and its porosity is therefore not constant, it is difficult to expand the sound absorption effect even to a wide frequency band.

The lightweight CMC sound-absorbing material according to Patent Document 2 is also produced by foaming ceramics and its porosity is therefore not constant so that a satisfactory sound-absorbing effect in a wide frequency band cannot be attained.

The porous sound-absorbing material according to Patent Document 3 is composed of porous ceramics having a porosity of from 75% to 85% so that it is characterized in that it has adequate strength as a sound-absorbing material while maintaining a predetermined sound absorbing effect, and exhibits high sound absorbing effect against noise in a wide frequency band such as noise of a jet engine.

When it is exposed to a high-temperature high-speed exhaust gas, however, the porous ceramic is worn away and at last it loses its function.

As described above, conventional sound-absorbing materials having a honeycomb structure cannot achieve the sound absorbing performance in a wide frequency band which is a property necessary for the reduction of a jet noise and at the same time, when they are exposed to a high-temperature high-speed exhaust gas, they do not fulfill their function because the honeycomb material is damaged by it.

In addition, ordinarily used glass wool has low heat resistance (300° C. or less), while the sound-absorbing materials disclosed in Patent Documents 1 to 3 have problems that in spite of having high heat resistance, they cannot provide stable sound absorbing performance in a wide frequency band which is a property necessary for the reduction of jet noise, are worn away easily by a high-temperature high-speed exhaust gas, and are not light in weight.

The present invention has been made in order to overcome the above-described problems. An object of the present invention is to provide a fiber-reinforced heat-resistant sound-absorbing material which remains undamaged for a long period of time even exposed to a high-temperature high-speed exhaust gas of a jet engine or the like, has a sound absorbing performance in a wide frequency band which is a property necessary for the reduction of jet noise, and is light in weight; and a production process of the material.

SUMMARY OF THE INVENTION

The present invention makes it possible to provide a fiber-reinforced heat-resistant sound-absorbing material comprising a fiber preform made of silicon carbide short fibers having heat resistance of 1000° C. or greater and a heat resistant compound having heat resistance of 1000° C. or greater and applied onto the surface of the fibers; and having a porosity of 90% or greater.

The present invention also makes it possible to provide a process for producing a fiber-reinforced heat-resistant sound-absorbing material, which comprises a fiber preform formation step of forming a fiber preform made of silicon carbide short fibers having heat resistance of 1000° C. or greater; a sol-gel solution preparation step of preparing a sol-gel solution containing a heat resistant compound having heat resistance of 1000° C. or greater; an impregnation-drying-calcination step of impregnating the fiber preform with the sol-gel solution, followed by drying and calcining; and a crystallization step of crystallizing the fiber preform which has finished impregnation, drying and calcination.

According to the constitution and the process of the present invention, a fiber-reinforced heat-resistant sound-absorbing material is produced using silicon carbide fibers and heat resistant compound, each having heat resistance of 1000° C. or greater so that the fiber-reinforced heat-resistant sound-absorbing material has essentially improved heat resistance. In addition, since the fiber-reinforced heat-resistant sound-absorbing material is composed of a heat-resistant compound reinforced with a fiber preform, it has strength enough to be resistant for a long period of time against exposure to a high-temperature high-speed exhaust gas of a jet engine or the like. Moreover, the impregnation-drying-calcination step and the crystallization step contribute to an increase in the porosity (90% or greater) of the material, making it possible to actualize a sound absorbing performance in a wide frequency band which is a property necessary for the reduction of jet noise, and to decrease the weight of the sound-absorbing material.

According to the preferred embodiment of the present invention, a fiber-reinforced heat-resistant sound-absorbing material having a bulk density of 0.07 g/cm$^3$ or greater but not greater than 0.11 g/cm$^3$ is available by repeating impregnation, drying and calcination in the impregnation-drying-calcination step.

It has been confirmed by Examples that by the above-described constitution and process, a high absorption coefficient of noise in a wide frequency band (for example, from 1000 to 4000 Hz) which becomes necessary for the reduction of jet noise and weight reduction can be attained.

The silicon carbide fibers preferably contain a metal element which is selected from the class consisting of Group II, III and IV metal atoms of the periodic table and in which a temperature at which a free energy change in the carbon reduction reaction of an oxide of the metal element becomes a negative value is higher than a temperature at which a free energy change in the carbon reduction reaction of silicon oxide becomes a negative value, and have an oxygen content falling within a range of from 1 to 13 wt. %.

Such silicon carbide fibers are commercially available from Ube Industries under the trade mark of "Tyranno fiber" which has been confirmed to have heat resistance to a temperature as high as about 1500° C.

The above-described sol-gel solution is preferably a solution in which Ba, Al, Si and Mg ions or molecules or complex ions containing, in the structure thereof, such elements have been dissolved or dispersed at a weight ratio permitting precipitation of barium osumilite crystals at the time of the crystallization treatment. The heat-resistant compound is preferably a BaO.Al$_2$O$_3$.SiO$_2$.MgO oxide represented by BaMg$_2$Al$_6$Si$_9$O$_{30}$.

Such a BaO.Al$_2$O$_3$.SiO$_2$.MgO oxide is generally called as "BMAS". The compound has been confirmed to be resistant to a temperature as high as about 1500° C. and in addition, can be prepared by the liquid phase process.

As described above, the fiber-reinforced heat-resistant sound-absorbing material and production process thereof according to the present invention have excellent effects, for example, the material is not damaged for a long period of time even by exposure to a high-temperature high-speed exhaust gas such as a gas from a jet engine, has a sound absorbing performance in a wide frequency band which becomes necessary for reducing jet noise, and is light in weight.

BRIEF DESCRIPTION OF THE DRAWINGS

FIG. 2 is a flow chart illustrating the production process according to the present invention.

DESCRIPTION OF THE PREFERRED EMBODIMENTS

Figure 1:
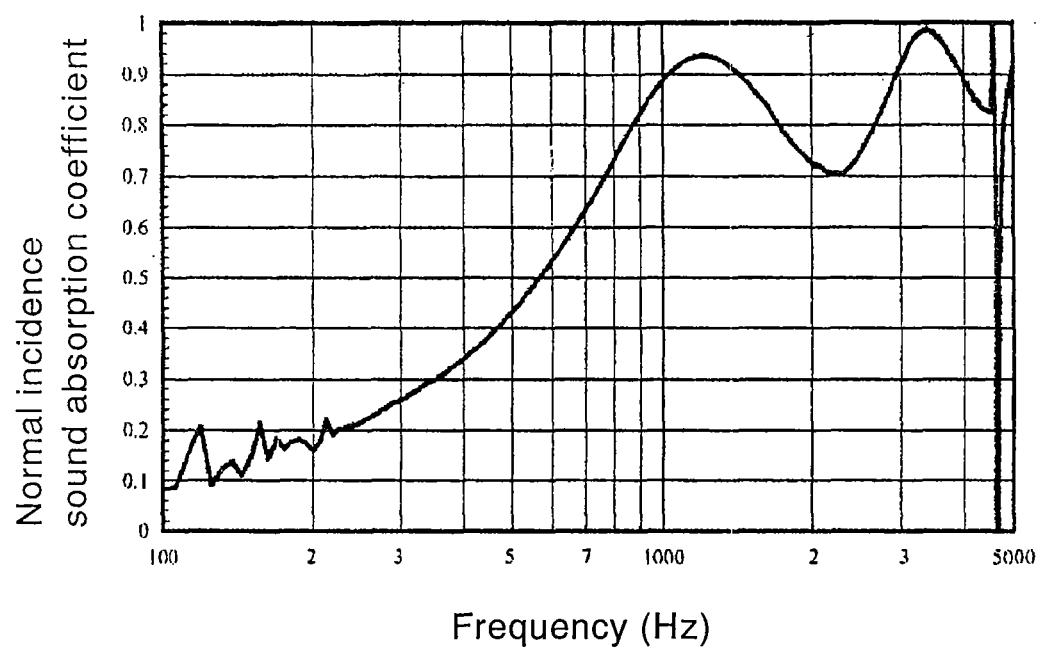
FIG. 1 is a graph of absorption coefficient of a conventional material (porous sound-absorbing material of Patent Document 3) for normal incidence sounds.

Preferred embodiments of the present invention will be described referring to the accompanied drawings. In all the drawings, elements having like function will be identified by like reference numerals and overlapping descriptions will be omitted.

FIG. 2 is a flow chart illustrating the production process of the present invention. As illustrated in this flow chart, the production process of the fiber-reinforced heat-resistant sound-absorbing material according to the present invention comprises a preform formation step S1, a sol-gel solution preparation step S2, an impregnation-drying-calcination step S3, and a crystallization step S4.

In the preform formation step S1, a fiber preform S2 is formed using silicon carbide short fibers 13 having heat resistance of 1000° C. or greater.

In the sol-gel solution preparation step S2, a sol-gel solution 4 containing a heat-resistant compound having resistance of 1000° C. or greater is prepared.

In the impregnation-drying-calcination step S3, the fiber preform 2 is impregnated with the sol-gel solution 4. In this impregnation-drying-calcination step, the impregnation, drying and calcination are preferably repeated until the bulk density reaches 0.07 g/cm$^3$ or greater but not greater than 0.11 g/cm$^3$.

In the crystallization step S4, the fiber preform 5 after impregnation, drying and calcination is subjected to crystallization treatment to complete the preparation of a fiber-reinforced heat-resistant sound-absorbing material 6.

The silicon carbide fibers 1 preferably contain a metal element which is selected from the class consisting of Group II, III and IV metal atoms of the periodic table and in which a temperature at which a free energy change in the carbon reduction reaction of an oxide of the metal element becomes a negative value is higher than a temperature at which a free energy change in the carbon reduction reaction of silicon oxide becomes a negative value; and have an oxygen content falling within a range of from 1 to 13 wt. %.

In addition, the silicon carbide fibers 1 are preferably crystalline silicon carbide fibers having a density of from 2.7 to 3.2 g/cm$^3$, containing, in terms of a weight ratio, from 50 to 70% of Si, from 28 to 45% of C, from 0.06 to 3.8% of Al and from 0.06 to 0.5% of B, and being composed of a sintered structure of SiC.

Such silicon carbide fibers are commercially available from Ube Industries under the trade mark of "Tyranno fiber" and especially, Tyranno Lox or Tyranno ZMI fiber or Tyranno SA fiber having higher heat resistance is suited. It has been confirmed that these fibers have resistance against temperatures as high as about 1500° C.

The sol-gel solution 4 is preferably a solution having dissolved therein Ba, Al, Si and Mg ions, or molecules or complex ions containing, in the structure thereof, these elements at a weight ratio permitting precipitation of barium osumilite crystals at the time of the crystallization treatment.

Such a $BaO.Al_2O_3.SiO_2.MgO$ oxide is generally called as "BMAS". It has been confirmed that the compound is resistant to high temperature of about 1500° C. and can be prepared by the liquid phase process.

No particular limitation is imposed on the heat-resistant compound insofar as it can be prepared by the liquid phase process and is equipped with heat resistance necessary for a sound-absorbing material. Specific examples include oxides of an element such as aluminum, magnesium, silicon, yttrium, indium, uranium, calcium, scandium, tantalum, niobium, neodymium, lanthanum, ruthenium, rhodium, beryllium, titanium, tin, strontium, barium, zinc, zirconium or iron, and mixed oxides of these metals.

Specific examples of the mixed oxides include $LiO_2$—$Al_2O_3$—$MgO$—$SiO_2$ oxide and $LiO_2$—$Al_2O_3$—$MgO$—$SiO_2$—$Nb_2O_s$ oxide, each having β-spodumene as a main crystal phase, $MgO$—$Al_2O_3$—$SiO_2$ oxide having cordierite as a main crystal phase, $BaO$—$MgO$—$Al_2O_3$—$SiO_2$ oxide having barium osumilite as a main crystal phase, $BaO$—$Al_2O_3$—$SiO_2$ oxide having mullite or hexacelsian as a main crystal phase, and $CaO$—$Al_2O_3$—$SiO_2$ oxide having anorthite as a main crystal phase. These mixed oxides may have, in the crystal phase thereof, cristobalite.

EXAMPLE 1

(Preparation of Felt)

In the preform formation step S1, a fiber preform 2 in the felt form was prepared using "Tyranno ZMI Fiber" (Si—Zr—C—O fiber). In this Example, the fiber preform 2 in the felt form having a predetermined porosity (bulk density) was obtained by stacking short fibers (chops) having a fiber diameter of 14 µm and fiber length of 50 mm one after another at random and then applying a pressure on the stack. The bulk density was determined from the volume and weight of the preform in the felt form, while the porosity was determined from the following equation:

Porosity[%]=bulk density/true density of the constituent material×100%.

In the present invention, no particular limitation is imposed on the forming method of the fiber preform and the melt blown process for preparing a felt using continuous fibers can also be employed.

(Preparation of Solution)

In the sol-gel solution preparation step S2, the sol-gel solution 4 for producing BMAS is prepared. BMAS is a $BaO.Al_2O_3.SiO_2.MgO$ oxide. It has a composition represented by $BaMg_2Al_2Si_9O_{30}$ and its mineral name is barium osumilite.

The below-described raw materials are used for the preparation of the sol-gel solution.

metal barium (Ba), ethoxymagnesium ($Mg(OC_2H_5)_2$), aluminum isopropoxide ($Al(O.C_3H_7)_3$), tetraethoxysilane ($Si(OC_2H_5)_4$), isopropyl alcohol ($CH_3CH(OH)CH_3$), and acetylacetone ($CH_3COCH_2COCH_3$).

In the sol-gel solution preparation step S2, a three-necked flask was purged with dry nitrogen, followed by the introduction of 1200 ml of isopropyl alcohol. To it was added 8.1 g of metal barium to synthesize an alkoxide of barium. To the resulting solution were added 13.4 g of ethoxymagnesium, 144.0 g of aluminum isopropoxide and 110.2 g of tetraethoxysilane (TEOS) and the resulting mixture was stirred at 80° C. for at least 4 hours to dissolve the latter in the former. To the resulting solution was added 27.5 g of acetyl acetone as a deflocculant. The resulting mixture was stirred at 80° C. for 3 hours to prepare a sol-gel solution. The resulting solution is used as a solution 4 for producing BMAS.

The resulting solution was dried and calcined at 1250° C. for 1 hour in the air, whereby white powder was obtained. As a result of X-ray diffraction of the resulting powder, precipitation of barium osumilite crystals was confirmed.

(Production of Sound-absorbing Material)

In the impregnation-drying-calcination step S3, the fiber preform 2 in the form of a felt which had been cut into a predetermined size was impregnated in the sol-gel solution 4, followed by vacuum deaeration to sufficiently impregnate the solution in the fiber preform. The fiber preform taken out from the solution was allowed to stand for 20 minutes on a shelf plate on which an excess solution could be removed. The fiber preform from which excess solution had been removed sufficiently was dried using a drying apparatus at 80° C. for 8 hours and then calcined at 500° C. for 30 minutes in the air. The procedure of impregnation, drying and calcination was repeated until the fiber preform had a desired bulk density.

In this test, two products different in bulk density, that is, a low bulk density product (from 0.07 to 0.08 $g/cm^3$) and a high bulk density product (0.11 $g/cm^3$) were manufactured. The above-described procedure was repeated twice for the production of the low bulk density product and eight times for the production of the high bulk density product.

The sample which had finished the desired times of impregnation, drying and calcination was subjected to crystallization treatment at 1250° C. for 1 hour in the crystallization Step S4. After the completion of baking, the crystallized sample was processed into a final product of a necessary size.

Figure 3A:
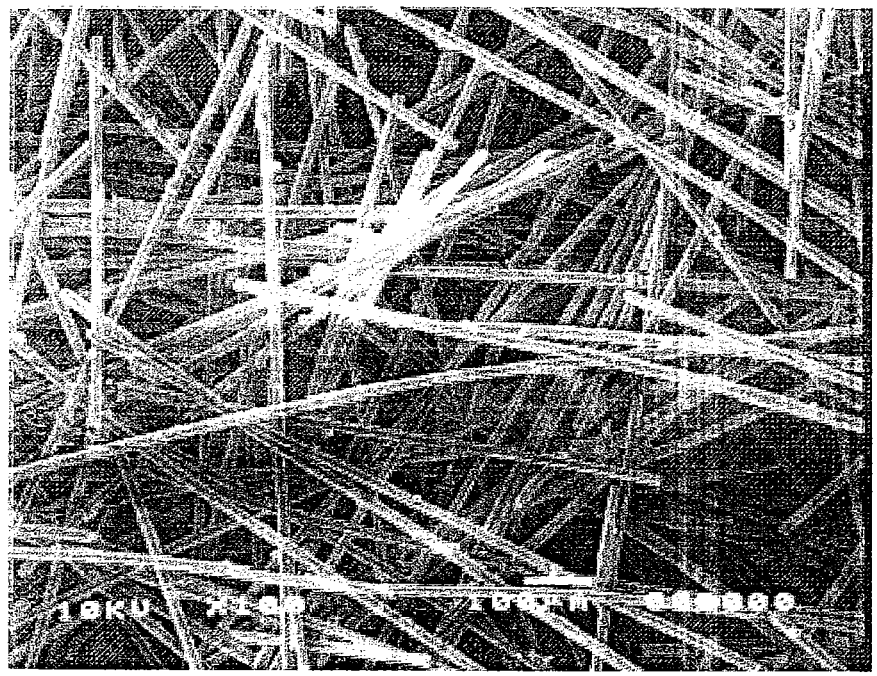
FIGS. 3A and 3B are enlarged pictures (×100) of the fiber-reinforced heat-resistant sound-absorbing materials (with high bulk density) according to the present invention.
Figure 3B:
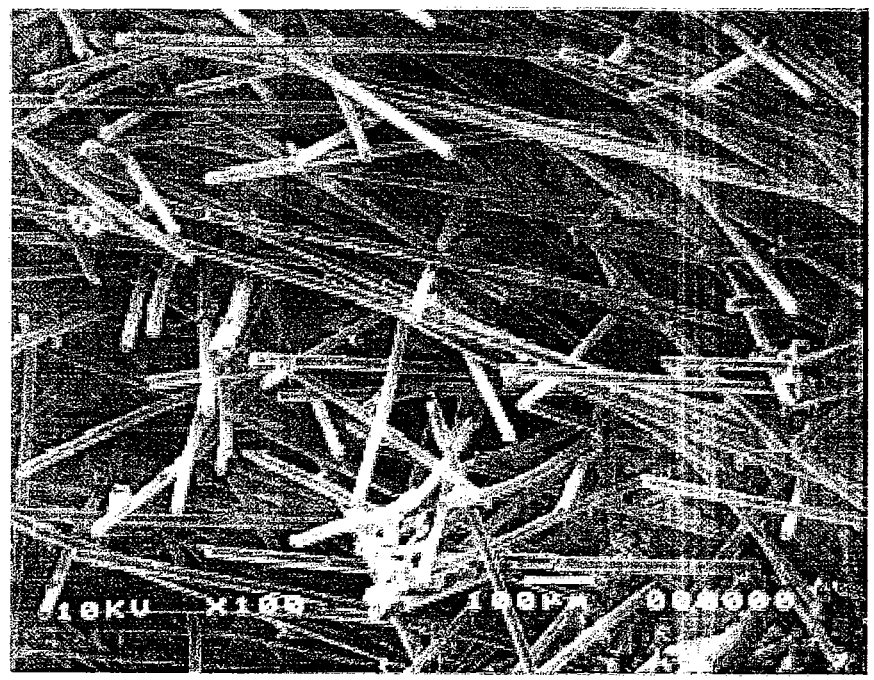
Figure 4A:
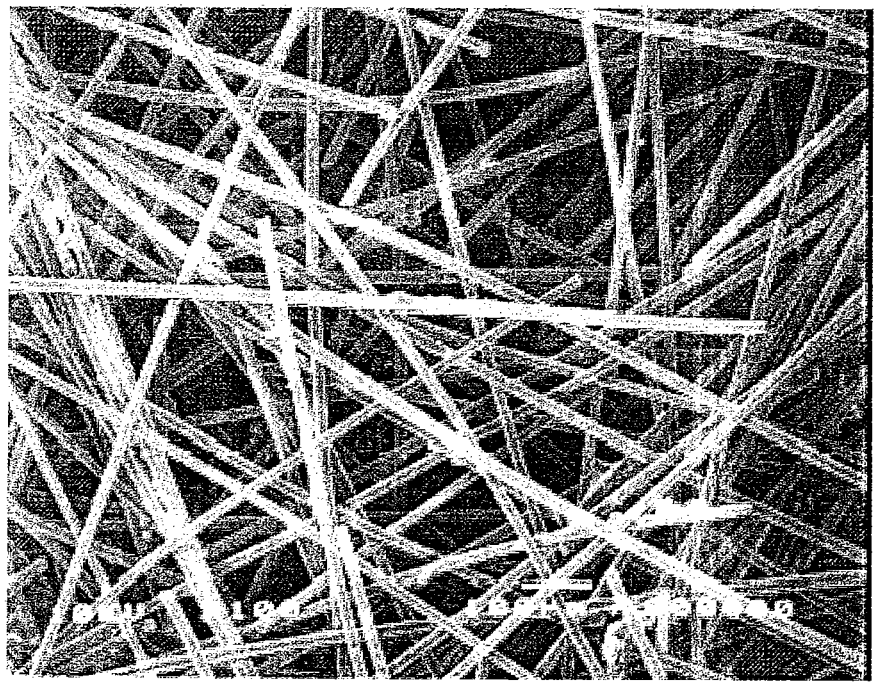
FIGS. 4A and 4B are enlarged pictures (×100) of the fiber-reinforced heat-resistant sound-absorbing materials (with low bulk density) according to the present invention.
Figure 4B:
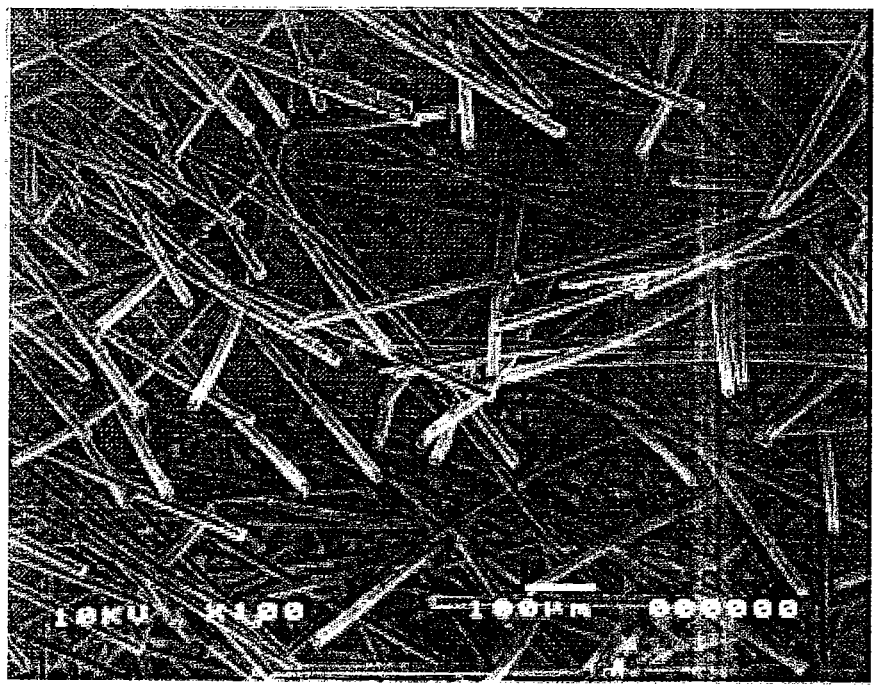

FIGS. 3A and 3B and FIGS. 4A and 4B are each an enlarged picture (×100) of the completed fiber-reinforced heat-resistant sound-absorbing material of the present invention. FIGS. 3A and 3B are pictures of a high bulk density product, while FIGS. 4A and 4B are pictures of a low bulk density product. FIGS. 3A and 4A are top views, while FIGS. 3B and 4B are side views. These drawings suggest that the silicon carbide fibers 1 are made of short fibers (chops) having a fiber diameter of 14 µm and fiber length of 50 mm, and the fiber preform 2 has the silicon carbide fibers 1 stacked one after another at random. The heat-resistant compound 3 applied to the surface of the fibers is present on the surface so as to bind the fibers, but its amount is very small.

The measurement results of the bulk density of the completed fiber-reinforced heat-resistant sound-absorbing material are shown in Table 1. The raw materials are added at the following weight ratio:

High bulk density product: Tyranno: BMAS=0.53:0.47

Low bulk density product: Tyranno: BMAS=0.82 to 0.9:0.18 to 0.1

The completed fiber-reinforced heat-resistant sound-absorbing material has the following porosity:

High bulk density product: 0.96

Low bulk density product: 0.97.

TABLE 1

Measurement results of bulk density of sound-absorbing material before test

| | Type | Number | Diameter (mm) | Height (mm) | Weight (g) | Bulk density (g/cm³) |
|---|---|---|---|---|---|---|
| High bulk density product | A | 1 | 43 | 75 | 12.4717 | 0.11 |
| | | 2 | 43 | 75 | 11.4940 | 0.11 |
| | | 3 | 43 | 75 | 12.0842 | 0.11 |
| Low bulk density product | B | 1.1 | 43 | 37.5 | 3.9389 | 0.072 |
| | | 1.2 | 43 | 37.5 | 4.4269 | 0.081 |
| | | 2.1 | 43 | 37.5 | 4.0866 | 0.075 |
| | | 2.2 | 43 | 37.5 | 4.3600 | 0.080 |
| | | 3.1 | 43 | 37.5 | 4.2310 | 0.078 |
| | | 3.2 | 43 | 37.5 | 4.3757 | 0.080 |

It has been confirmed by the test which will be described later that the completed fiber-reinforced heat-resistant sound-absorbing material has a porosity of 90% or greater and has a high sound absorbing performance in a wide frequency band. In addition, a preform having a bulk density of from 0.072 to 0.11 g/cm³ can be obtained and also the weight can be reduced to about one fourth of the porous sound-absorbing material.

EXAMPLE 2

(Thermal Shock Test)

The sound absorbance, size and weight of the above-described two fiber-reinforced heat-resistant sound-absorbing materials 6 different in bulk density were measured before and after exposure to thermal shock.

The thermal shock test was conducted under the following cycles: the number of thermal shock cycles: 60 cycles, time per cycle: 75 minutes, maximum steady-state temperature/time: 610 K (337° C.)/35 minutes, heating to the maximum temperature: 20 minutes.

A change in the size or weight of the sample between before and after the thermal shock test was measured to find the presence or absence of a change in the shape of pores.

The measurement results of the bulk density of the sound-absorbing material after thermal shock test are shown in Table 2.

TABLE 2

Measurement results of bulk density of sound-absorbing material after test

| Product | Type | Number | Diameter (mm) | Height (mm) | Weight (g) | Bulk density (g/cm³) |
|---|---|---|---|---|---|---|
| High bulk density product | A | 1 | 43 | 75 | 12.4642 | 0.11 |
| Low bulk density product | B | 1.1 | 43 | 37.5 | 3.8957 | 0.072 |
| | | 1.2 | 43 | 37.5 | 4.4087 | 0.081 |

Figure 5:
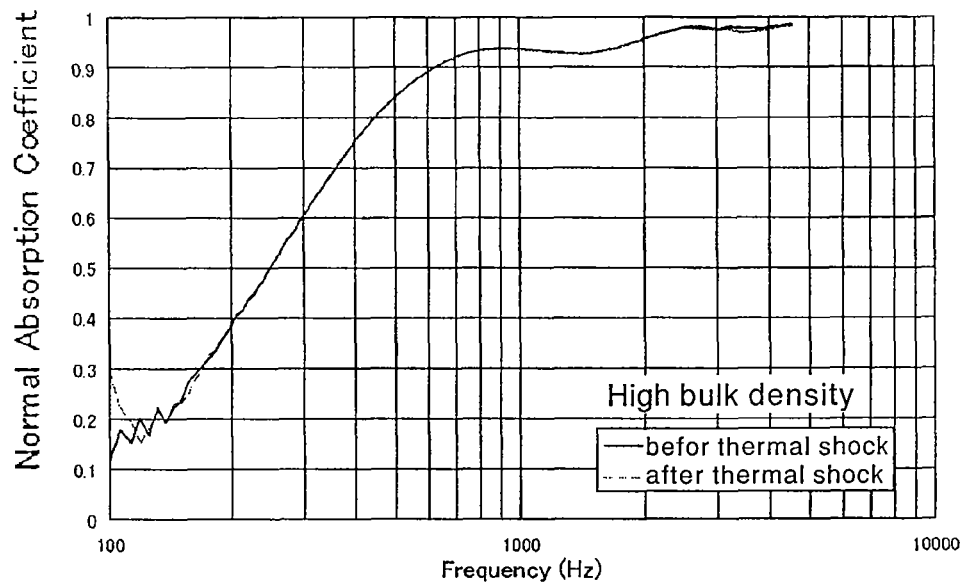
FIG. 5 is a graph of a normal incidence sound absorption coefficient, before and after thermal shock test, of the fiber-reinforced heat-resistant sound-absorbing material (with high bulk density) according to the present invention.
Figure 6:
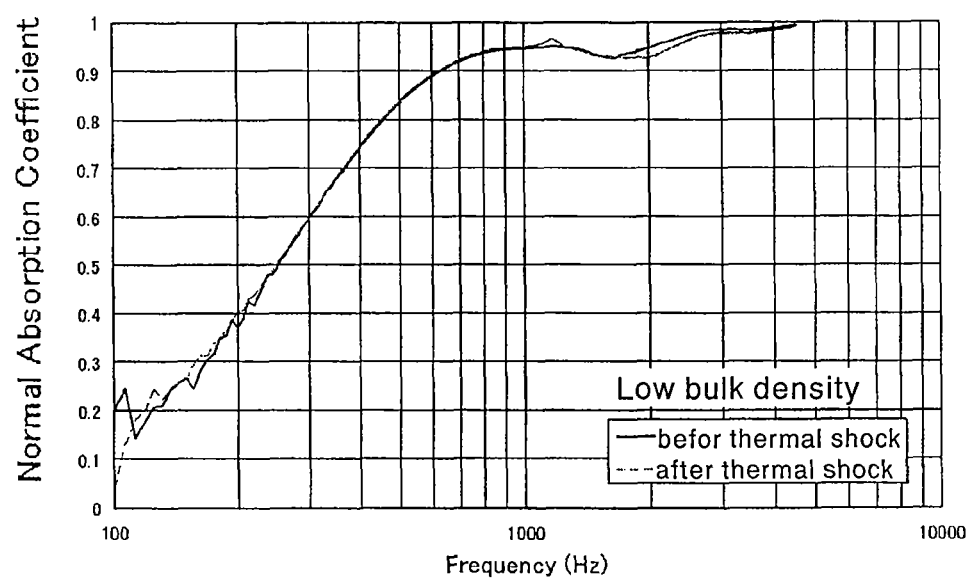
FIG. 6 is a graph of a normal incidence sound absorption coefficient, before and after thermal shock test, of the fiber-reinforced heat-resistant sound-absorbing material (with low bulk density) according to the present invention.

FIG. 5 and FIG. 6 are graphs, before and after the thermal shock test, of a normal incidence sound absorption coefficient of the high bulk density product and low bulk density product, respectively. In each drawing, frequency and normal incidence sound absorption coefficient are plotted along the abscissa and ordinate, respectively. A solid line indicates the absorption coefficient before thermal shock and a dotted line indicates that after thermal shock. FIG. 1 is a graph of the normal incidence sound absorption coefficient of the conventional material (porous sound-absorbing material of Patent Document 3) and corresponds to that before thermal shock test of each of FIGS. 5 and 6.

It has been understood from FIGS. 5 and 6 that the normal incidence sound absorption coefficient is almost equal between before and after the thermal shock test and deterioration in performance does not occur by the thermal shock. It has also been found from the comparison with FIG. 1 that in a wide frequency band from 1000 to 4000 Hz which becomes necessary for the reduction of a jet noise, noise absorption of at least about 95%, which is superior to that of the conventional material, can be attained stably.

EXAMPLE 3

(Evaluation Test of Heat Resistance)

Two fiber-reinforced heat-resistant sound-absorbing materials different in bulk density were evaluated. In this test, a test piece which had been impregnated sufficiently with kerosene, followed by removal of excess kerosene on a drain board was used as a sample. The resulting test piece was ignited with a lighter and when it was burnt out, the test was completed. The test piece was then collected. The test piece was weighed before and after the combustion test. The test was conducted at a flaming temperature of about 1700° C.

The heat resistance test results are shown in Table 3. A slight increase in weight was observed after the test, which is presumed to owe to the kerosene remaining unburned and the soot deposited on the surface of the sample. The fiber-reinforced heat-resistant sound-absorbing material 6 is not damaged at all even exposed to the flaming temperature of about 1700° C. for 10 minutes or greater, suggesting that it has heat resistance against temperatures as high as about 1500° C.

TABLE 3

Test results of heat resistance of sound-absorbing material

| Product | Type | Number | Weight before test (g) | Weight of sample impregnated with kerosene (g) | Weight after test (g) | Burning time |
|---|---|---|---|---|---|---|
| High bulk density product | A | 2 | 11.50 | 60.81 | 11.69 | 11 minutes 20 seconds |
| Low bulk density product | B | 3.1 (lower) 3.2 (upper) | 8.60 | 64.60 | 8.78 | 11 minutes 11 seconds |

The invention claimed is:

1. A process for producing a fiber-reinforced heat-resistant sound-absorbing material, the process comprising the steps of:
    (a) forming a fiber preform made of silicon carbide short fibers having a length of 50 mm or less and a heat resistance of at least 1000° C.;
    (b) preparing a sol-gel solution containing a heat resistant compound having heat resistance of at least 1000° C.;
    (c) impregnating the fiber preform with the sol-gel solution, then drying and calcining the fiber preform; and
    (d) crystallizing the fiber preform after impregnation, drying and calcination,
    wherein the silicon carbide fibers contain a metal element which is selected form the class consisting of Group I, III and IV metal atoms of the periodic table and in which a temperature at which a free energy change in the carbon reduction reaction of the oxide of the metal element becomes a negative value is higher than a temperature at which a free energy change in the carbon reduction reaction of silicon oxide becomes a negative value; and
    wherein the silicon carbide fibers have an oxygen content falling within a range of from 2 to 13 wt. %,
    wherein the resulting fiber-reinforced heat-resistant sound-absorbing material has a porosity of at least 95%, and a noise absorption of at least 95 % in a frequency band of 1000 to 4000 Hz.

2. The process of producing the fiber-reinforced heat-resistant sound-absorbing material according to claim 1, wherein, in step (c), impregnation, drying and calcination are repeated until the material has a bulk density of at least 0.07 g/cm$^3$ but not greater than 0.11 g/cm$^3$.

3. The process of producing the fiber-reinforced heat-resistant sound-absorbing material according to claim 1, wherein the sol-gel solution is a solution in which Ba, Al, Si and Mg ions, or molecules or complex ions, thereof, have been dissolved or dispersed at a weight ratio permitting precipitation of barium osumilite crystals at the time of the crystallization treatment.

* * * * *